United States Patent [19]

Sakakiyama

[11] Patent Number: 4,730,711
[45] Date of Patent: Mar. 15, 1988

[54] ELECTROMAGNETIC CLUTCH CONTROL SYSTEM FOR AUTOMOBILES

[75] Inventor: Ryuzo Sakakiyama, Tokyo, Japan

[73] Assignee: Fuji Jukogyo Kabushiki Kaisha, Tokyo, Japan

[21] Appl. No.: 768,889

[22] Filed: Aug. 23, 1985

[30] Foreign Application Priority Data

Aug. 31, 1984 [JP] Japan .................. 59-182315

[51] Int. Cl.$^4$ ............ B60K 41/28; B60K 41/02; F16D 37/02
[52] U.S. Cl. .............. 192/0.052; 192/0.023; 192/0.076; 192/3.56
[58] Field of Search ........... 192/0.052, 0.033, 0.076, 192/0.092, 0.096, 3.56, 21.5

[56] References Cited

U.S. PATENT DOCUMENTS

| | | | |
|---|---|---|---|
| 3,073,422 | 1/1963 | Baumann | 192/0.052 |
| 3,134,470 | 5/1964 | Weis et al. | 192/0.052 X |
| 4,401,199 | 8/1983 | Takano et al. | 192/0.052 |
| 4,473,192 | 9/1984 | Makishima | 192/4 A |
| 4,494,641 | 1/1985 | Sakakiyama | 192/0.076 |

FOREIGN PATENT DOCUMENTS

| | | | |
|---|---|---|---|
| 33225 | 3/1977 | Japan | 192/0.076 |
| 79338 | 5/1982 | Japan | 192/21.5 |
| 201727 | 12/1982 | Japan | 192/4 A |
| 993632 | 6/1965 | United Kingdom | 192/3.56 |
| 2088011 | 6/1982 | United Kingdom | 192/21.5 |
| 846865 | 7/1981 | U.S.S.R. | 192/0.076 |

Primary Examiner—Rodney H. Bonck
Assistant Examiner—David A. Testardi
Attorney, Agent, or Firm—Martin A. Farber

[57] ABSTRACT

A system for controlling an electromagnetic clutch of an engine for a motor vehicle having a transmission. The system has various sensors such as an engine speed sensor, a vehicle speed sensor for detecting low vehicle speed, an accelerator pedal position sensor for detecting the acceleration of the engine, and a selector lever position sensor. The system has computing means for determining the clutch current at the beginning of the engagement of the electromagnetic clutch. The clutch current is determined such that a large clutch current is supplied at lower engine speed, and a small clutch current is supplied at higher engine speed at the beginning of the engagement of the clutch.

10 Claims, 7 Drawing Figures

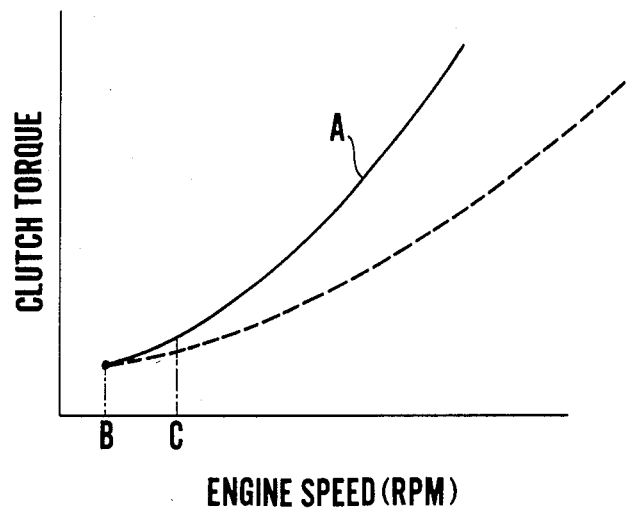
FIG. 1
PRIOR ART
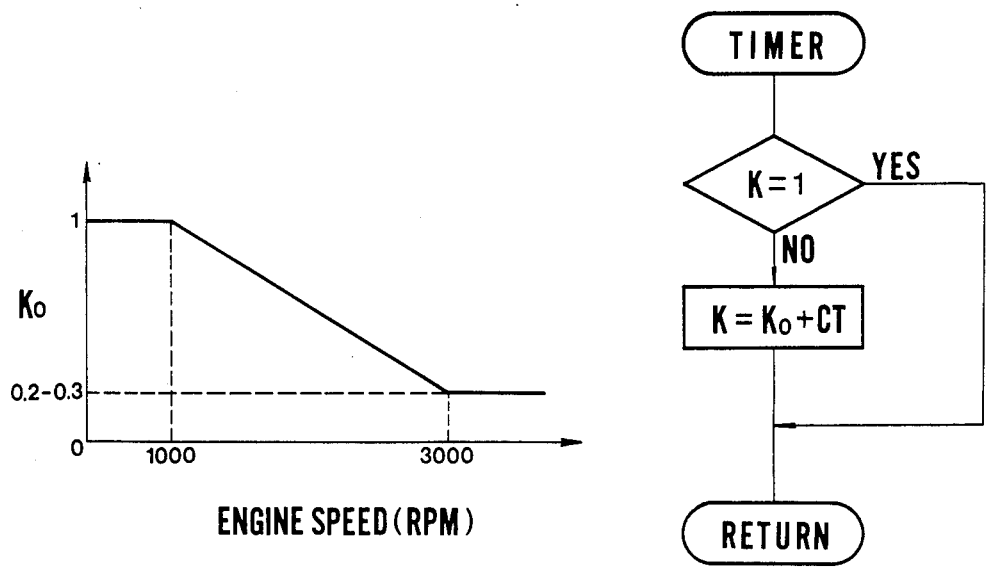
FIG. 5
FIG. 7

ELECTROMAGNETIC CLUTCH CONTROL SYSTEM FOR AUTOMOBILES

BACKGROUND OF THE INVENTION

The present invention relates to a system for controlling an electromagnetic clutch for an automotive engine, and more particularly to a system for controlling clutch current at the engagement of the clutch.

An electromagnetic powder clutch as a type of electromagnetic clutch for a motor vehicle is known. The electromagnetic powder clutch comprises an annular drive member secured to a crankshaft of an engine, a magnetizing coil provided in the drive member, a driven member secured to an input shaft of a transmission and provided adjacent to the drive member defining a small gap therebetween and magnetic powder provided in a chamber in the clutch. Change speed gears in the transmission are changed by operating a selector lever. The selector lever is provided with a switch for the circuit of the magnetizing coil. When the selector lever is gripped by the operator's hand, the switch is opened to cut off the clutch current. Accordingly, change gear operation of the transmission can be done. When the selector lever is shifted to the gear engaging position, and released from the hand, the switch is closed so that electric current flows through the magnetizing coil to magnetize the drive member. As engine speed increases in accordance with the depression of an accelerator pedal of the vehicle, the clutch current applied to the coil increases with an increase of repetition frequency of ignition pulses. The magnetic powder is aggregated in the gap between the drive member and the driven member, so that the driven member is coupled to the drive member. More particularly, the clutch current passing through the magnetizing coil progressively increases according to the increase of frequency of the ignition pulses, while the clutch slips between the drive member and the driven member and gradually engages when the clutch current increases to a rated current. Thus, the motor vehicle may be smoothly started by depressing the accelerator pedal without operating a clutch pedal.

FIG. 1 shows the relationship between engine speed and clutch torque (clutch current). In a normal engine operation, the clutch torque varies as shown by a curve A. When the accelerator pedal is depressed, the clutch torque begins to increase at normal idling speed B. If a choke valve of the engine is closed or an air conditioning device of the vehicle is operated, the idling speed is increased to a high idling speed C and the clutch torque for starting the vehicle is increased to a large value at the high idling speed C. Accordingly, the vehicle starts abruptly by the large clutch torque.

A clutch current control system which is capable of eliminating the above described disadvantage has been proposed. The control system is adapted to slowly increase the clutch current in response to a choke signal or air conditioning signal. Thus, the clutch torque increases as shown by the dashed line in FIG. 1, so that the clutch may slip in a wider range, thereby smoothly starting a motor vehicle. However, the engine idling speed provided in response to the choke or air conditioning signal is not always constant. If the motor vehicle is started at a low idling speed, the clutch slips for a long time, which causes a low starting characteristic of the vehicle. If the vehicle is started at a high idling speed, which is caused, for example, by the effect of a dash pot device, the vehicle is abruptly started with a shock.

SUMMARY OF THE INVENTION

The object of the present invention is to provide a control system which operates to change the starting characteristic in accordance with idling speed at the beginning of the engagement of an electromagnetic clutch, whereby a motor vehicle can be smoothly started.

According to the present invention, there is provided a system for controlling an electromagnetic clutch of an engine comprising engine speed sensing means for producing an engine speed signal dependent on the engine speed of the engine, vehicle speed sensing means for producing a vehicle speed signal in a low vehicle speed range, an accelerator pedal position sensor for producing an acceleration signal when an accelerator pedal of a motor vehicle is depressed, and selector lever position detecting means for producing a selector lever signal when a selector lever of a transmission is positioned other than at a neutral position and a parking position. The system further comprises circuit means for supplying clutch current to a magnetizing coil of the electromagnetic clutch; first means responsive to the vehicle speed signal, acceleration signal and selector lever signal for initiation of engagement of the clutch; and second means for determining the clutch current at said initiation of the engagement of the electromagnetic clutch in accordance with the engine speed signal, the clutch current at the initiation of the engagement of the clutch being determined by the engine speed at the initiation and by a coefficient, said coefficient being a function of engine speed at the initiation which is reduced as the engine speed at the initiation is increased such that the clutch current at the initiation of the engagement of the clutch is reduced as the engine speed at the initiation is increased.

The other objects and features of this invention will be apparently understood from the following description with reference to the accompanying drawings.

BRIEF DESCRIPTION OF DRAWINGS

FIG. 1 is a graph showing the relationship between clutch torque and the engine speed of a conventional system;

FIG. 5 is a graph showing the relationship between engine speed and coefficient Ko for obtaining clutch torque characteristic; and FIGS. 6 and 7 are flowcharts showing the operation of the system according to the present invention.

DETAILED DESCRIPTION OF THE PREFERRED EMBODIMENTS

Figure 2:
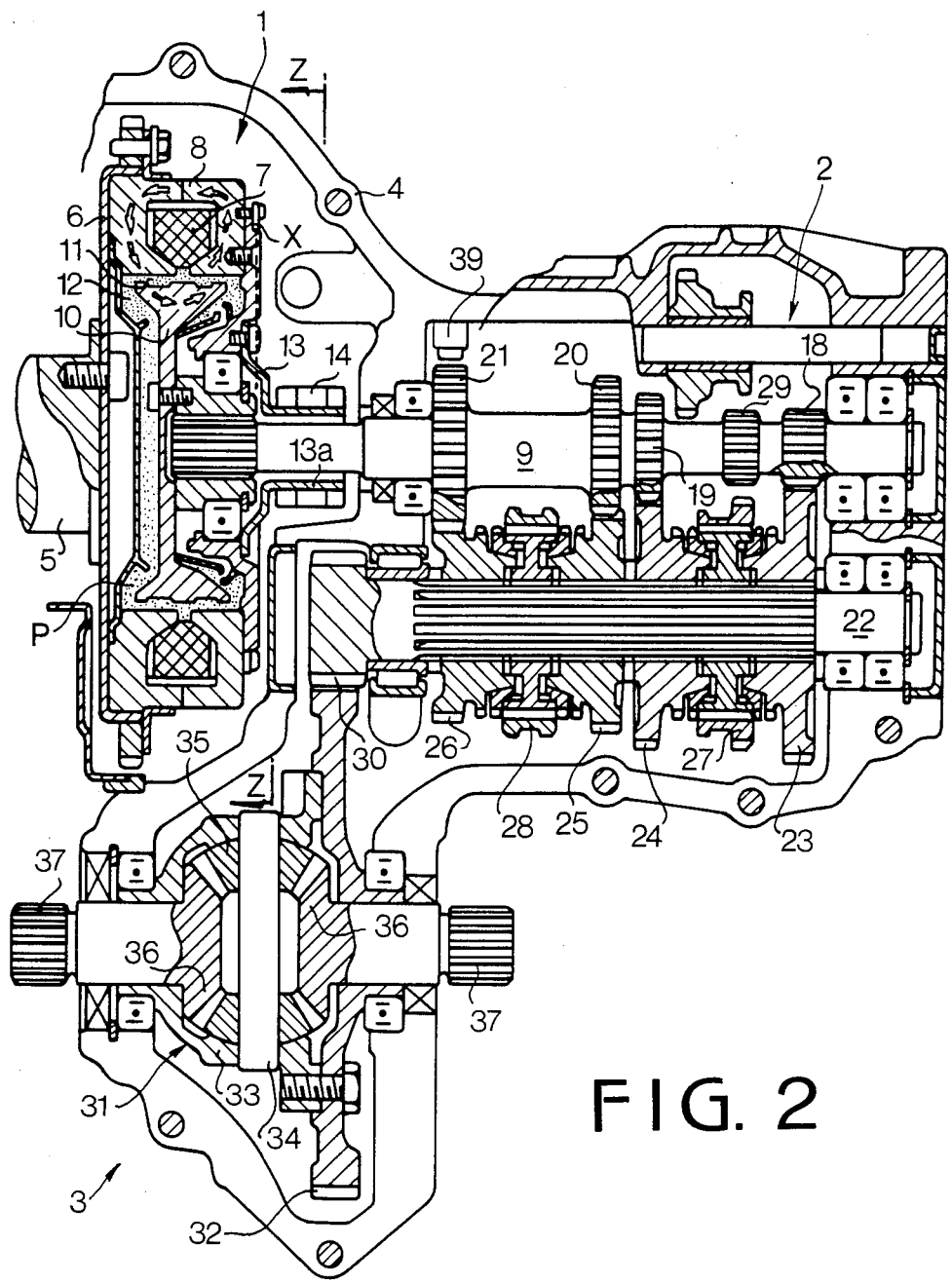
FIG. 2 is a cross-sectional view of an electromagnetic powder clutch used in a system according to the present invention.
Figure 3:
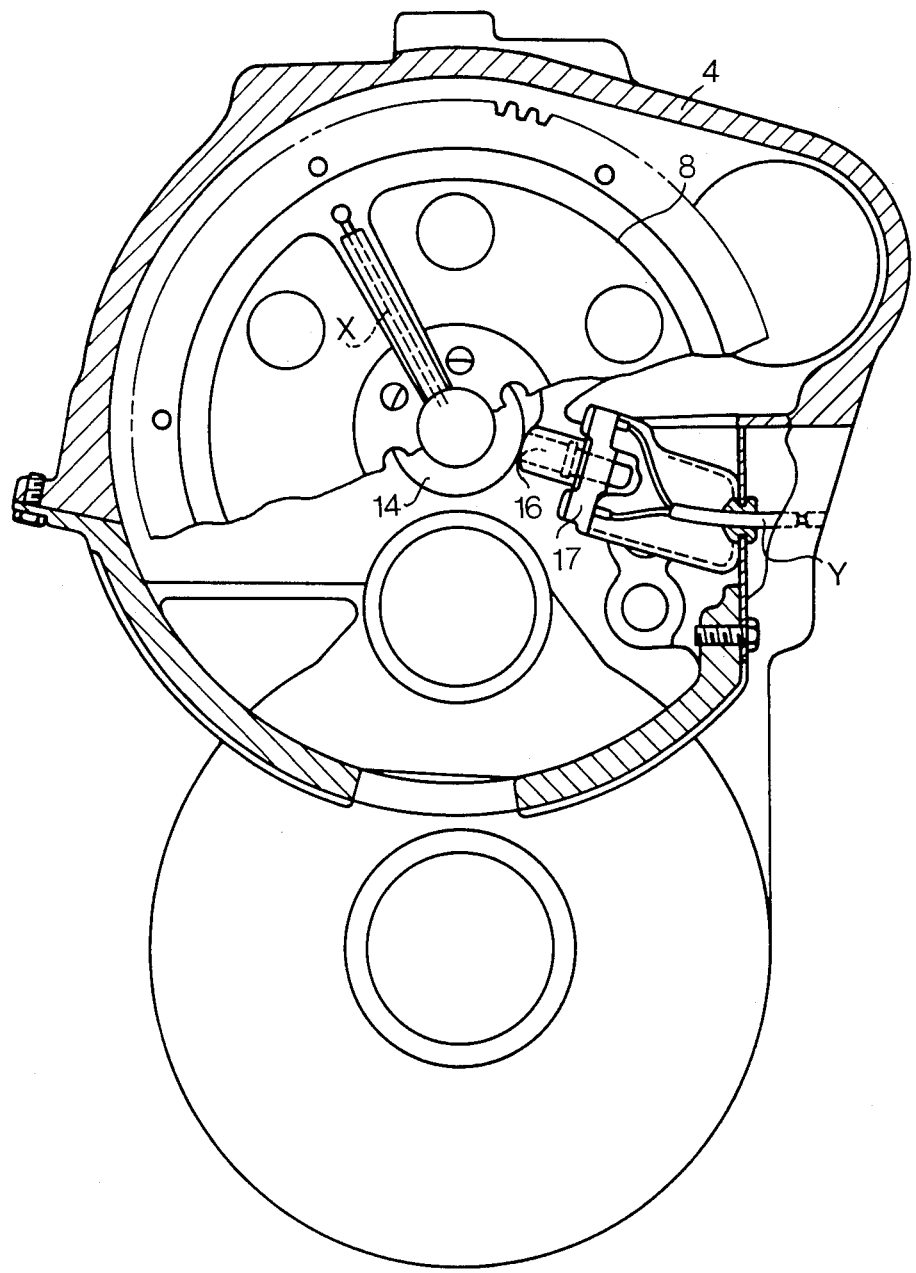
FIG. 3 is a cross-section taken along line Z—Z of FIG. 1.

Referring to FIGS. 2 and 3 showing a transmission system to which the present invention is applied, the transmission system comprises an electromagnetic powder clutch 1, a four-speed transmission 2 and a final reduction device 3.

The electromagnetic powder clutch 1 provided in a clutch case 4 comprises a drive plate 6 secured to the end of a crankshaft 5 of an internal combustion engine, an annular drive member 8 secured to the drive plate 6, a magnetizing coil 7 provided in the drive member 8, and a driven member 10 secured by a spline engagement to an input shaft 9 of the transmission 2, defining a gap 11 between the driven member 10 and drive member 8. Magnetic powder is provided in a powder chamber 12 and the gap 11 is adapted to be filled with the powder. A cap 13 is secured to the drive member 8. The cap 13 has a cylindrical portion coaxial with the input shaft 9, on which slip rings 14 are securely provided. Slip rings 14 are connected to the drive member 8 by a lead X. Brushes 16 pressed against the slip rings 14 are supported in a holder 17 and connected to a hereinafter described control system by a lead Y.

In such a construction, the drive plate 6 and the drive member 8 rotate together with the crankshaft 5 and the magnetic powder sealed into the powder chamber 12 is moved onto the inner surface of the drive member 8 by centrifugal force. If the magnetizing coil 7 is excited by the current applied through the lead Y, brushes 16, slip rings 14 and lead X, the drive member 8 is magnetized to produce a magnetic flux passing through the driven member 10. Thus, the powder is aggregated in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, respectively. The driven gears 23 to 26 are rotatably mounted on the output shaft 22 parallel to the input shaft 9. Each of the driven gears 23 and 24 is adapted to be engaged with the output shaft 22 by operating a synchronizer 27 and each of the driven gears 25 and 26 is engaged with the output shaft 22 by a synchronizer 28 in a well known manner. Further, a reverse drive gear means 29 is provided. Thus, by operating a selector lever (not shown) of the transmission, the driven gear 23 is coupled selectively with the output shaft 22 by the synchronizer 27 and the 1st speed is obtained on the output shaft 22 and the speed of the output shaft 9 is greatly decreased. The 2nd, 3rd and 4th speed may be respectively obtained accordingly.

Further, provided on an end of the output shaft 22 is an output gear 30 which engages with a ring gear 32 in a differential 31 of the final reduction device 3 to transmit the output of the output shaft 22 of the transmission 2 directly from ring gear 32 to side gears 36 through a case 33, a spider 34 and pinions 35, and further to driving wheels of a motor vehicle through wheel shafts 37.

Figure 4:
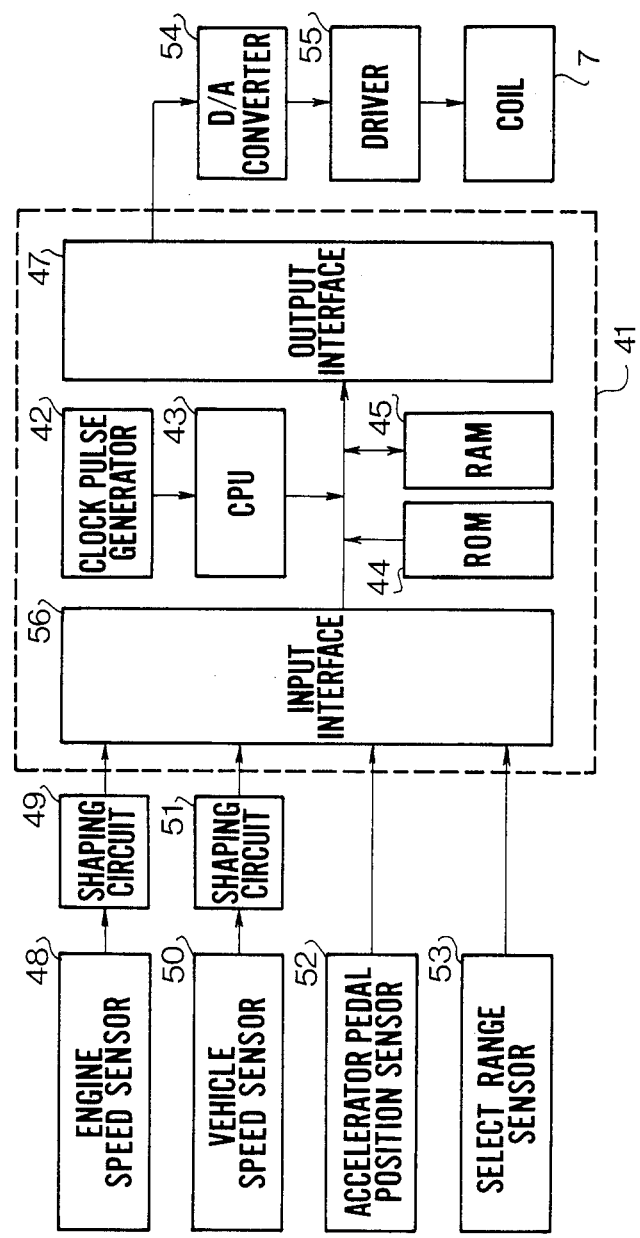
FIG. 4 is a block diagram showing an embodiment of the present invention.

FIG. 4 shows the control system which is provided with an engine speed sensor 48, vehicle speed sensor 50, accelerator pedal position sensor 52 for producing an output signal dependent on the degree of the depression of an accelerator pedal of the motor vehicle, and select range sensor 53 for producing an output signal when the selector lever is positioned at a drive position except the neutral position and the parking position, that is one of the 1st to 4th speed positions or reverse position in the transmission of FIG. 2.

Output signals of sensors 48, 50 are applied to an input interface 56 of a microcomputer 41 through waveform shaping circuits 49, 51, respectively. The output signals of the sensors 52 and 53 are also applied to the input interface 56. The microcomputer comprises a clock pulse generator 42, CPU 43, ROM 44, RAM 45, and output interface 47. The output of the microcomputer is converted an analog signal by a D/A converter 54 and applied to the coil 7 through a driver 55.

The control system of the present invention is adapted to control the characteristic of clutch torque in accordance with idling speed of the engine at the beginning of the engagement of the clutch. The clutch torque characteristic of the line A in FIG. 1 can be expressed by the formula $f = T(N)$, where N is engine speed. The clutch torque characteristic of the present invention is expressed by a formula, $$f = K \cdot T(N)$$

where K is a coefficient ($0 < K \leq 1$) which is expressed by Ct (Ko+Ct), where C is a constant. The coefficient Ko is decided by engine speed at the beginning of the engagement of the clutch.

The coefficient Ko is changed in accordance with engine speed, for example, as shown in FIG. 5. When the engine idling speed is less than about 1000 rpm, the value of Ko is one (Ko=1), which means $f = f'$. As engine speed increases, the value of Ko is reduced. The value of Ko becomes constant at an engine speed higher than about 3000 rpm. This is to prevent the clutch torque from extremely reducing, thereby improving the starting characteristic.

Figure 6:
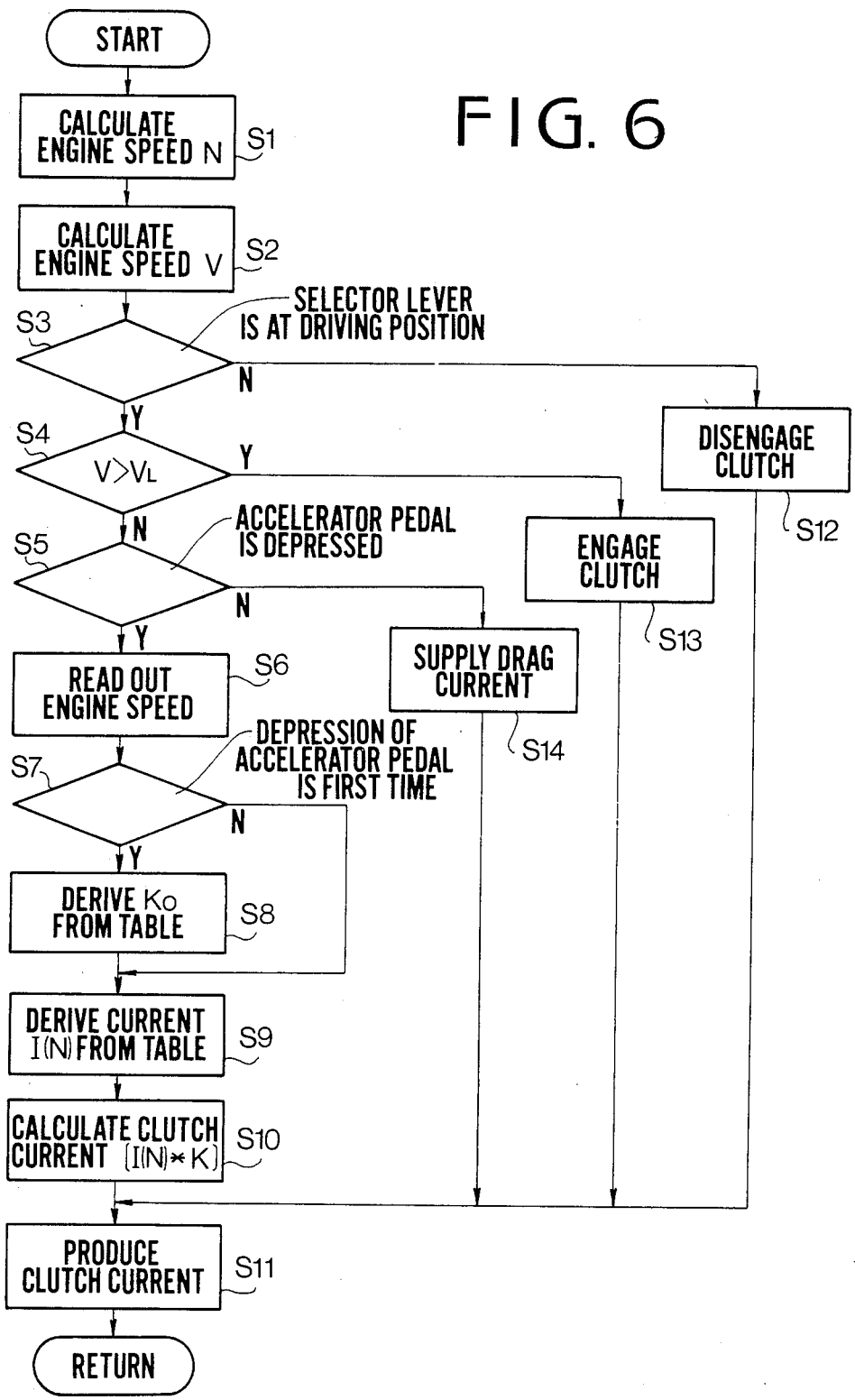

Explaining the operation of the control system with reference to FIGS. 6 and 7, at a step $S_1$, engine speed N is calculated, and at a step $S_2$, vehicle speed V is calculated. Thereafter, at a step $S_3$, it is determined whether the selector lever is at driving positions. If the selector lever is at the neutral position, the clutch current is cut off to disengage the clutch. If the selector lever is at a driving position, the program proceeds to a step $S_4$, where it is determined whether the vehicle speed V is higher than a predetermined vehicle speed $V_L$ (10–25 Km/h). If V is higher than $V_L$, the rated clutch current flows passing through the coil to entirely engage the clutch at a step $S_{13}$. If V is lower than $V_L$, the program proceeds to a step $S_5$, where it is determined whether the accelerator pedal is depressed. If the accelerator pedal is released, a drag current is supplied to the coil 7 at a step $S_{14}$ so as to partially engage the clutch. If the accelerator pedal is depressed, engine speed is read out at a step $S_6$. Thereafter the program proceeds to a step $S_7$, where it is determined whether the depression of the accelerator pedal is the first time. If it is the first time, the program proceeds to a step $S_8$, where the value of Ko is derived from a table in the ROM 44 in accordance with the engine speed. If the depression is not the first time, or after the operation at the step has finished, the program proceeds to a step $S_9$, where current I(N) according to the engine speed is derived from a table in the ROM 44. Further, the current I(N) is multiplied by K at a step $S_{10}$ to obtain a clutch current. It will be understood that the above-mentioned clutch torque T(N) may be replaced by the current I(N).

On the other hand, the coefficient K is obtained by a subroutine shown in FIG. 7. The subroutine is initiated by a timer at intervals of a predetermined time (several m.sec. to 50 m.sec.). At a step $S_{15}$, the term Ct is obtained by integrating C every t time, and Ct is added to Ko to produce K. Thus, clutch current (I(N)K) is obtained at a step $S_{11}$.

Although the above described control system employs a manual transmission, an infinitely variable belt drive transmission can be employed for the system of the present invention.

From the foregoing it will be understood that the present invention provides a system which controls the clutch current in accordance with engine speed at the beginning of the engagement of a clutch, whereby a motor vehicle can be smoothly started.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling an electromagnetic clutch of an engine for a motor vehicle having a transmission, comprising:
   engine speed sensing means for producing an engine speed signal dependent on speed of the engine;
   vehicle speed sensing means for producing a vehicle speed signal at low vehicle speed;
   an accelerator pedal position sensor for producing an acceleration signal when an accelerator pedal of the motor vehicle is depressed;
   selector lever position detecting means for producing a selector lever signal when a selector lever of the transmission is positioned at a position other than a neutral position and a parking position;
   circuit means for supplying clutch current to a magnetizing coil of the electromagnetic clutch for engaging the clutch;
   said circuit means comprising:
   first means responsive to the vehicle speed signal, acceleration signal and selector lever signal for initiation of engagement of the clutch; and
   second means for determining the clutch current at said initiation of the engagement of the electromagnetic clutch in accordance with the engine speed signal, the clutch current at the initiation of the engagement of the clutch being determined by the engine speed at the initiation and by a coefficient, said coefficient being a function of engine speed at the initiation and is reduced as the engine speed at the initiation is increased such that the clutch current at the initiation of the engagement of the clutch is reduced as the engine speed at the initiation is increased.

2. The system as set forth in claim 1, wherein said second means determines the clutch current at said initiation as the product of a first function of engine speed and said coefficient.

3. The system as set forth in claim 2, wherein said first function increases with increasing engine speed.

4. The system as set forth in claim 2, wherein said first function increases with increasing engine speed both at the time of initiation of engagement of the clutch and thereafter.

5. A system for controlling an electromagnetic clutch of an engine for a motor vehicle having a transmission, comprising:
   vehicle speed sensing means for producing a vehicle speed signal at low vehicle speed;
   an accelerator pedal position sensor for producing an acceleration signal when an accelerator pedal of the motor vehicle is depressed;
   selector lever position detecting means for producing a selector lever signal when a selector lever of the transmission is positioned at a position other than a neutral position and a parking position;
   circuit means for supplying clutch current to a magnetizing coil of the electromagnetic clutch for engaging the clutch;
   said circuit means comprising:
   first means responsive to the vehicle speed signal, acceleration signal and selector lever signal for initiation of engagement of the clutch;
   second means for determining the clutch current at said initiation of the engagement of the electromagnetic clutch in accordance with engine speed at the initiation of the engagement of the clutch, the clutch current at the initiation of the engagement of the clutch being determined by the engine speed at the initiation and by a coefficient, said coefficient being a function of engine speed at the initiation and is reduced as the engine speed at the initiation is increased such that the clutch current at the initiation of the engagement of the clutch is reduced as the engine speed at the initiation is increased.

6. The system as set forth in claim 5, wherein said second means determines the clutch current at said initiation as the product of a first function of engine speed and said coefficient.

7. The system as set forth in claim 6, wherein said first function increases with increasing engine speed.

8. The system as set forth in claim 6, wherein said first function increases with increasing engine speed both at the time of initiation of engagement of the clutch and thereafter.

9. A system for controlling an electromagnetic clutch of an engine for a motor vehicle having a transmission, comprising:
   engine speed sensing means for producing an engine speed signal dependent on speed of the engine;
   vehicle speed sensing means for producing a vehicle speed signal at low vehicle speed;
   an accelerator pedal position sensor for producing an acceleration signal when an accelerator pedal of the motor vehicle is depressed;
   selector lever position detecting means for producing a selector lever signal when a selector lever of the transmission is positioned at a position other than a neutral position and a parking position;
   circuit means for supplying clutch current to a magnetizing coil of the electromagnetic clutch for engaging the clutch;
   said circuit means comprising:
   first means responsive to the vehicle speed signal, acceleration signal and selector lever signal for initiation of engagement of the clutch; and
   second means for determining the clutch current at said initiation of the engagement of the electromagnetic clutch in accordance with the engine speed signal, the clutch current at the initiation of the engagement of the clutch being determined by the engine speed at the initiation and by a coefficient, said coefficient being a function of engine speed at the initiation and is reduced as the engine speed at the initiation is increased;
   said second means determines the clutch current at said initiation as the product of a first function of engine speed and said coefficient; and
   said coefficient is a constant plus a linearly decreasing function of engine speed at said initiation of engagement of the clutch between predetermined values of the engine speed and is constant with respect to engine speed at said initiation of engagement of the clutch above and below said predetermined values thereof.

10. A system for controlling an electromagnetic clutch of an engine for a motor vehicle having a transmission, comprising:

vehicle speed sensing means for producing a vehicle speed signal at low vehicle speed;

an accelerator pedal position sensor for producing an acceleration signal when an accelerator pedal of the motor vehicle is depressed;

selector lever position detecting means for producing a selector lever signal when a selector lever of the transmission is positioned at a position other than a neutral position and a parking position;

circuit means for supplying clutch current to a magnetizing coil of the electromagnetic clutch for engaging the clutch;

said circuit means comprising:

first means responsive to the vehicle speed signal, acceleration signal and selector lever signal for initiation of engagement of the clutch;

second means for determining the clutch current at said initiation of the engagement of the electromagnetic clutch in accordance with engine speed at the initiation of the engagement of the clutch, the clutch current at the initiation of the engagement of the clutch being determined by the engine speed at the initiation and by a coefficient, said coefficient being a function of engine speed at the initiation and is reduced as the engine speed at the initiation is increased;

said second means determines the clutch current at said initiation as the product of a first function of engine speed and said coefficient; and said coefficient is a constant plus a linearly decreasing function of engine speed at said initiation of engagement of the clutch between predetermined values of the engine speed and is constant with respect to engine speed at said initiation of engagement of the clutch above and below said predetermined values thereof.

* * * * *